(12) United States Patent
Rozman et al.

(10) Patent No.: US 8,669,743 B2
(45) Date of Patent: Mar. 11, 2014

(54) DIRECT CURRENT ELECTRIC POWER SYSTEM WITH ACTIVE DAMPING

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 110 days.

(21) Appl. No.: 13/218,172

(22) Filed: Aug. 25, 2011

(65) Prior Publication Data

US 2013/0049886 A1 Feb. 28, 2013

(51) Int. Cl.
*G05F 3/16* (2006.01)
(52) U.S. Cl.
USPC ............................. 323/224; 323/222; 363/49
(58) Field of Classification Search
USPC ............................. 323/222, 223, 224; 363/49
See application file for complete search history.

(56) References Cited

U.S. PATENT DOCUMENTS

| | | | |
|---|---|---|---|
| 4,093,900 A | 6/1978 | Plunkett | |
| 4,119,861 A | 10/1978 | Gocho | |
| 4,420,784 A | 12/1983 | Chen et al. | |
| 4,638,175 A | 1/1987 | Bradford et al. | |
| 5,132,894 A | 7/1992 | Rozman et al. | |
| 5,291,143 A | 3/1994 | Cronauer | |
| 5,350,997 A * | 9/1994 | Ghotbi et al. | 323/268 |
| 5,422,517 A | 6/1995 | Verney et al. | |
| 5,455,731 A | 10/1995 | Parkinson | |
| 5,495,155 A | 2/1996 | Juzswik et al. | |
| 5,526,347 A * | 6/1996 | Chen et al. | 370/290 |
| 5,752,047 A | 5/1998 | Darty et al. | |
| 6,072,673 A | 6/2000 | Chen et al. | |
| 6,154,379 A * | 11/2000 | Okita | 363/40 |
| 6,577,138 B2 * | 6/2003 | Zuercher et al. | 324/536 |
| 6,643,112 B1 | 11/2003 | Carton et al. | |
| 7,315,774 B2 | 1/2008 | Morris | |
| 7,453,680 B2 | 11/2008 | Hallak et al. | |
| 7,564,147 B2 | 7/2009 | Michalko | |
| 7,595,613 B2 | 9/2009 | Thompson et al. | |
| 7,741,883 B2 | 6/2010 | Fuller et al. | |
| 7,830,071 B2 | 11/2010 | Abramovich et al. | |
| 7,847,429 B2 | 12/2010 | Miyama et al. | |
| 7,952,225 B2 | 5/2011 | Reichard et al. | |
| 2004/0156154 A1 | 8/2004 | Lazarovich et al. | |
| 2004/0238243 A1 | 12/2004 | King et al. | |

(Continued)

FOREIGN PATENT DOCUMENTS

DE 19607669 A1 9/1997
EP 1921531 A1 5/2008

OTHER PUBLICATIONS

European International Search Report dated Dec. 20, 2012 for Application No. 12181229.1-1233.

(Continued)

*Primary Examiner* — Adolf Berhane
*Assistant Examiner* — Lakaisha Jackson
(74) *Attorney, Agent, or Firm* — Cantor Colburn LLP

(57) ABSTRACT

An active damping switching system can include an active damper apparatus having a stabilization resistor, a stabilization switch coupled to the stabilization resistor, an active damper controller coupled to the stabilization switch, a current sensor coupled to the active damper controller. The system can further include a direct current power source coupled to the active damper apparatus, a constant power load and an input filter disposed between the constant power load and the active damper apparatus.

15 Claims, 3 Drawing Sheets

(56) References Cited

U.S. PATENT DOCUMENTS

2006/0103358 A1 5/2006 Schulte et al.
2007/0029986 A1 2/2007 Nakamura et al.
2008/0106152 A1 5/2008 Maier
2008/0143462 A1 6/2008 Belisle et al.
2009/0295341 A1 12/2009 Nakamura et al.
2009/0314179 A1 12/2009 Kumar
2010/0254046 A1 10/2010 Liu et al.
2011/0100735 A1 5/2011 Flett

OTHER PUBLICATIONS

European Search Report dated May 10, 2013 for Application No. 12181283.8-1503.

European Search Report dated May 10, 2013 for Application No. 12181417.2-1503.

* cited by examiner

US 8,669,743 B2

DIRECT CURRENT ELECTRIC POWER SYSTEM WITH ACTIVE DAMPING

BACKGROUND OF THE INVENTION

The subject matter disclosed herein relates to electric power generation and distribution, and more particularly to direct current (DC) electric power systems having active damping.

Electrical power systems in hybrid vehicles, such as military hybrid vehicles, can include high voltage direct current power generation and distribution systems. Such electrical systems, however, can experience stability problems. Constant power loads, such as a switched mode power converter may introduce a destabilizing effect on a DC bus, causing significant voltage oscillation. The source ripple filter must attenuate rectification ripple and current harmonics resulting from active rectifier switching. The input filter of a switching power converter must provide forward voltage attenuation of alternating current (AC) voltage superimposed on a DC bus voltage, attenuate current harmonics resulting from power converter switching and those injected into DC bus to allowed levels, and have a low output impedance so as not to adversely affect the stability of switched-mode power converter. A power converter's input LC filter without a damper introduces possible instability in the presence of constant power (i.e., negative impedance) loads. Traditionally LC or RC damping networks are used to stabilize unstable loads. The LC damper is connected in series with the inductor of the input LC filter, while an RC damper is connected in parallel with the capacitor of the input LC filter. The size of damping networks is considerably larger than the input LC filter itself, and can therefore be difficult to manage.

BRIEF DESCRIPTION OF THE INVENTION

Exemplary embodiments include an active damping switching system, including an active damper apparatus having a stabilization resistor, a stabilization switch coupled to the stabilization resistor, an active damper controller coupled to the stabilization switch, a current sensor coupled to the active damper controller. The system can further include a direct current power source coupled to the active damper apparatus, a constant power load and an input filter disposed between the constant power load and the active damper apparatus.

Additional exemplary embodiments include an active damping switching apparatus, including a stabilization resistor, a stabilization switch coupled to the stabilization resistor, an active damper controller coupled to the stabilization switch and a current sensor coupled to the active damper controller.

Further exemplary embodiments include a method of actively damping a current ripple in a direct current (DC) input in a high voltage DC system, the method including receiving the DC input, selecting the current ripple from the DC input, comparing the voltage ripple to a reference current ripple and generating a stabilization pulse in response to the current ripple exceeding the reference current ripple.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Exemplary embodiments include systems and methods for active damping to achieve stable system operation without use of passive LC or RC dampers. In exemplary embodiments, the systems and methods described herein implement a stabilization resistor selectively connected in parallel to an input filter inductor. In response to current rippled on the DC bus, the resistor is switched to dampen the ripple.

Figure 1:
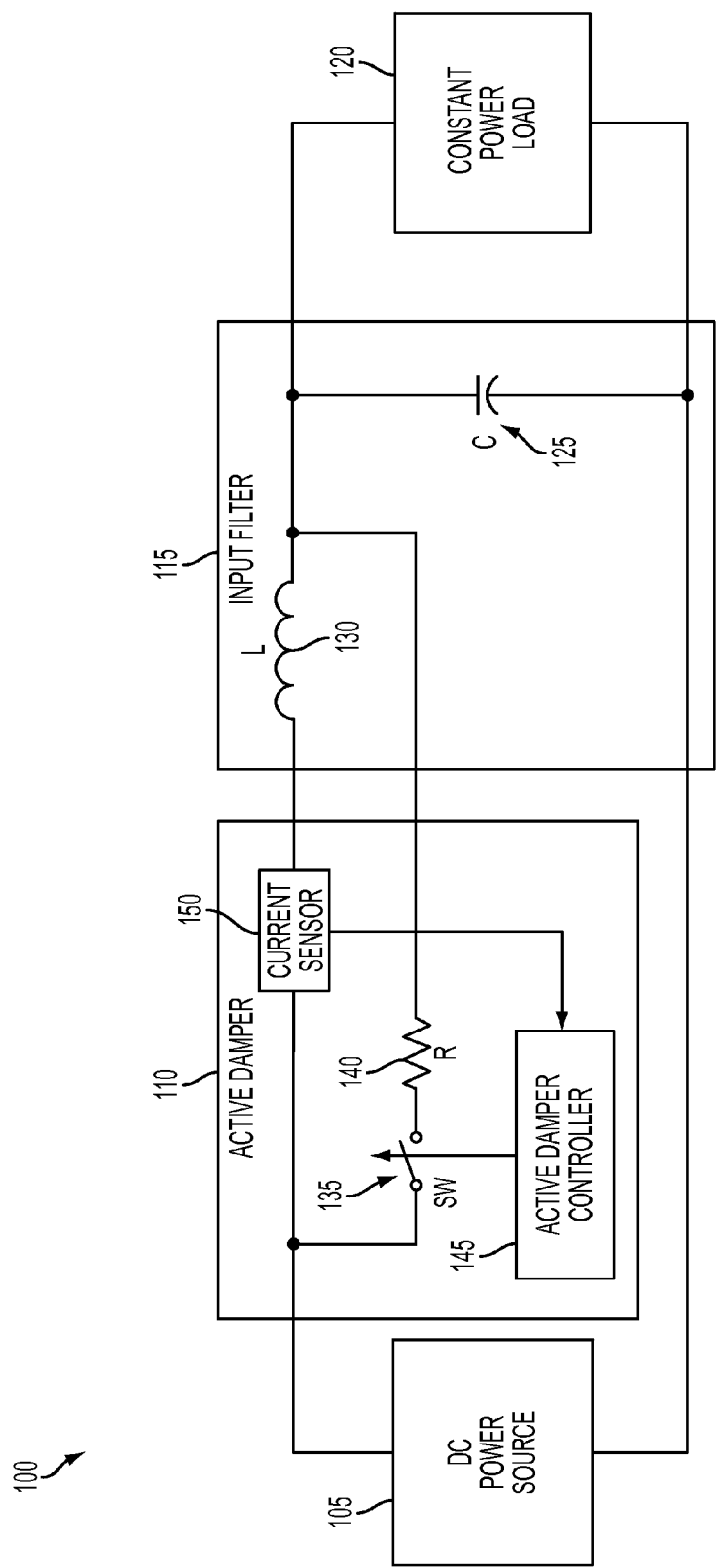
FIG. 1 illustrates an embodiment of an active damping system.

FIG. 1 illustrates an embodiment of active damping system 100. In one embodiment, the system 100 can include a DC power source 105 electrically coupled to an active damper 110. In one embodiment, the DC source 105 can be an AC generator whose output is rectified to a DC voltage that includes voltage ripples, or any other DC input that can include ripples. The system 100 can further include an input filter 115 electrically coupled to the active damper 110, and further electrically coupled to a constant power load 120. In one embodiment, the input filter 115 can be an LC filter having a capacitor 125 and an inductor 130 having values selected to filter out certain frequencies between the active damper 110 and the constant power load 120. In one embodiment, the active damper 110 can include a stabilization switch 135 electrically coupled to the DC power source 105. The stabilization switch 135 can further be coupled to a stabilization resistor 140, which is coupled to the input filter 115. The active damper 110 can further include an active damper controller 145 coupled to the stabilization resistor 140 and to a current sensor 150. In one embodiment, if the system 100 becomes unstable when the input filter 115 is connected to the constant power load 120, the active damper 110 stabilizes the system 100 by connecting the stabilization resistor 140 in parallel with the inductor 130 of the input filter 115 for a period of time creating a "stabilization pulse". The active damper 110 is responsive to the magnitude of a current ripple on DC bus at selected frequency of oscillations and can be controlled by the active damper controller 145 as now described. As such, the active damper controller 145 is configured to close the stabilization switch 135 that decreases a steady state voltage ripple or a steady state current ripple through the stabilization resistor 140.

Figure 2:
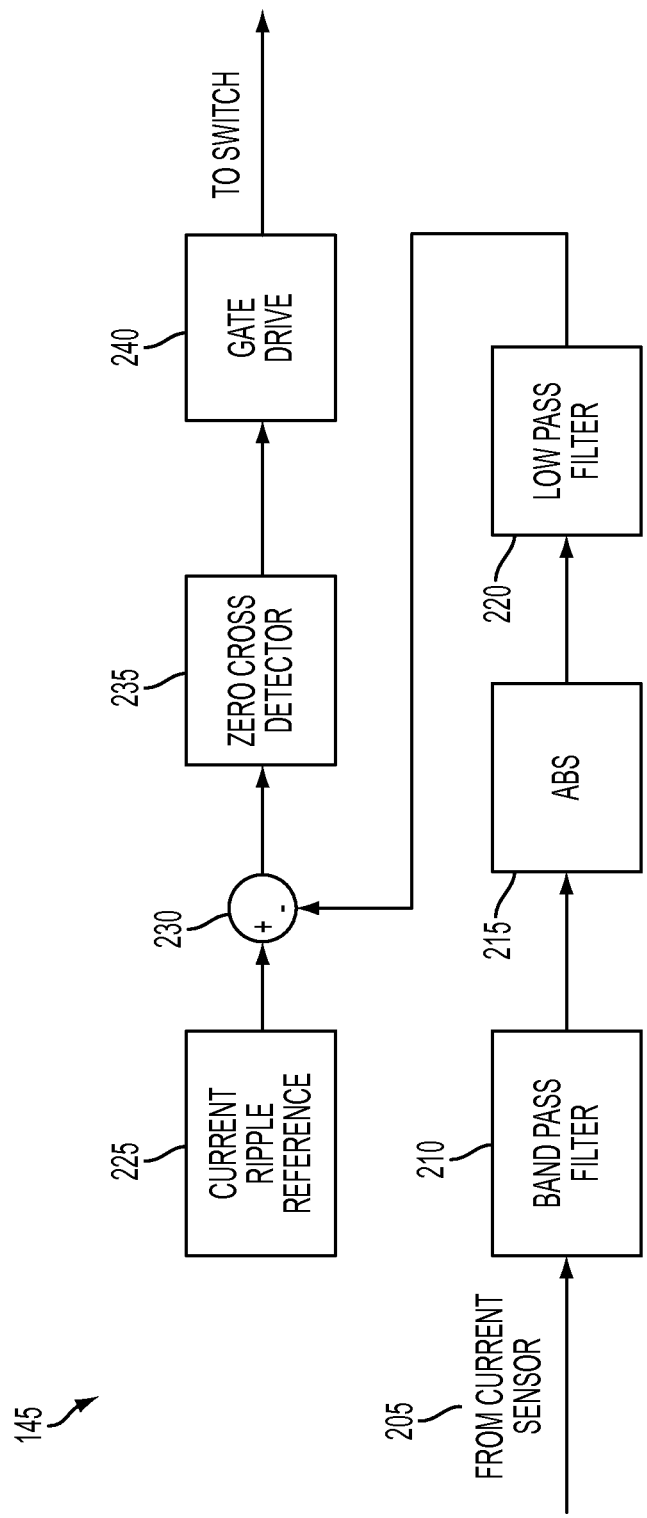
FIG. 2 illustrates an embodiment of an active damper controller.

FIG. 2 illustrates the active damper controller 145 of FIG. 1 in further detail. The damper controller 145 includes a current ripple input 205 from the current sensor 150 that measures the current in the system 100. In one embodiment, the current ripple, from the current ripple input 205 is selected by an amplitude detector that is comprised of a band pass filter 210, an absolute function 215, and a low pass filter 220. The band pass filter 210 tuned to the frequency defined by the input filter 115

$$\left(f = \frac{1}{2\pi\sqrt{LC}}\right).$$

The current ripple input 205 is then passed through an absolute value unit 215, and a low pass filter 220. The detected current ripple is compared to a current ripple reference 225 at a comparator 230. The current ripple reference 225 provides a known ripple factor that would be tolerant in the system 100. The stabilization switch 135 is enabled when the magnitude of the detected current ripple exceeds the current ripple reference 225 via a zero cross detector 235 and a gate drive 240. In one embodiment, the time to stabilize the system is short, so that the stabilization resistor 140 is subject to limited power for a short time.

Figure 3:
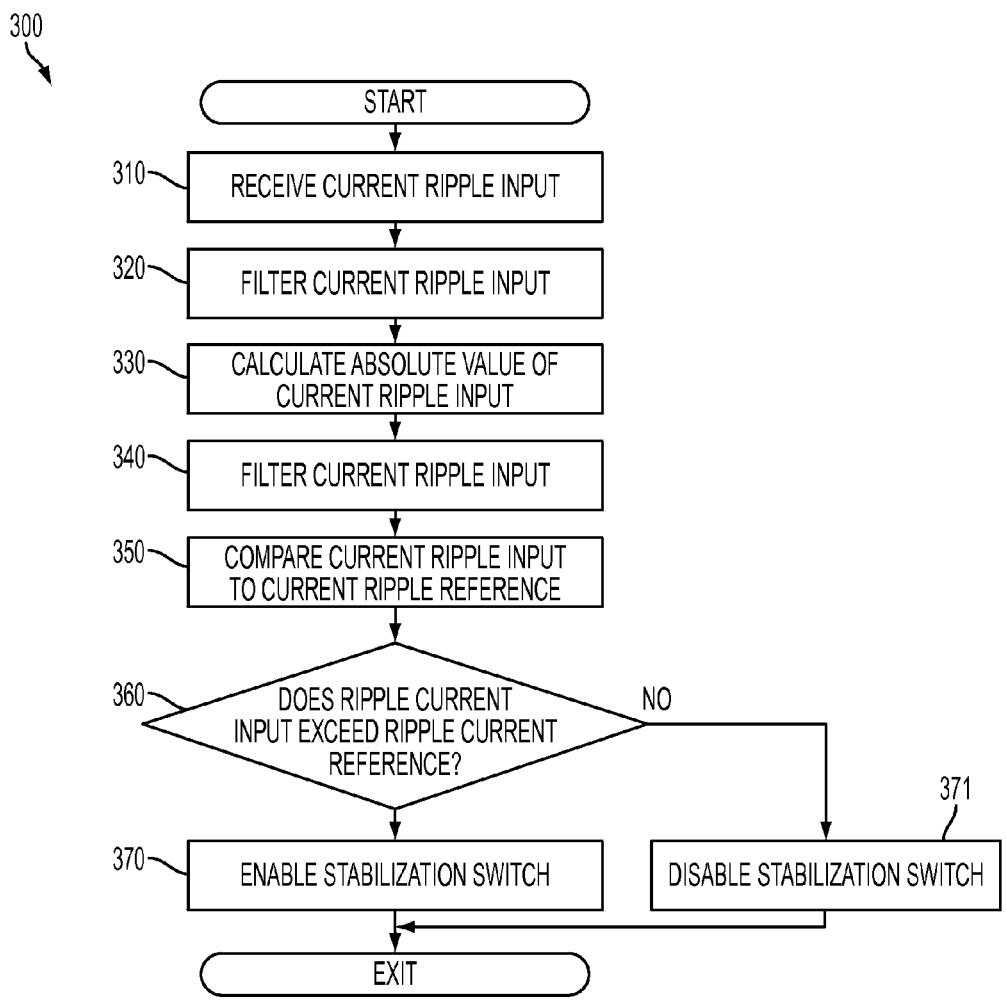
FIG. 3 illustrates a flow chart for a method of active damping in a high voltage DC system.

FIG. 3 illustrates a flow chart for a method 300 of actively damping a high voltage DC system. At block 310, the active damper controller 145 receives a current ripple input. As described herein, the active damper controller 145 filters the current ripple input through a band pass filter at block 320, calculates the absolute value of the current ripple input at block 330 and then passes the current ripple input through a low pass filter to produce a detected current ripple at block 340. At block 350, the detected current ripple is compared to a current ripple reference. If the detected current ripple does not exceed the current ripple reference at block 360, then the active damper controller 145 disables stabilization switch 135 at block 371 to disconnect stabilization resistor 140 to parallel inductor 115 and then exit. If the detected current ripple exceeds the current ripple reference at block 360, then at block 370 the active damper controller 145 closes the stabilization switch 135 to connect stabilization resistor 140 to parallel inductor 115 and then exits.

The active damper controller 145 can be any suitable microcontroller or microprocessor for executing the instructions (e.g., on/off commands) described herein. As such, the suitable microcontroller or microprocessor can be any custom made or commercially available processor, a central processing unit (CPU), an auxiliary processor among several processors, a semiconductor based microprocessor (in the form of a microchip or chip set), a microprocessor, or generally any device for executing software instructions.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Technical effects include an improvement of power quality of the system bus because voltage ripples can be actively damped. In addition, the systems and methods described herein reduce system weight, size, and cost by eliminating passive dampers, such as very large capacitors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An active damping switching system, comprising:
    an active damper apparatus, including:
        a stabilization resistor;
        a stabilization switch coupled to the stabilization resistor;
        an active damper controller coupled to the stabilization switch, the active damper controller comprising:
            a bandpass filter configured to select a current ripple from a DC input;
            an absolute value function unit coupled to the bandpass filter;
            a low pass filter coupled to the absolute value function unit to produce a detected current ripple; and
            a comparator configured to compare the detected current ripple to a reference current ripple; and
        a current sensor coupled to the active damper controller;
    a direct current (DC) power source coupled to the active damper apparatus;
    a constant power load; and
    an input filter disposed between the constant power load and the active damper apparatus.

2. The system as claimed in claim 1 wherein the active controller further comprises a zero cross detector coupled to the comparator.

3. The system as claimed in claim 1 wherein the active damper controller is configured to select a current ripple from a DC input as a detected current ripple.

4. The system as claimed in claim 3 wherein the active damper controller is configured to compare the detected current ripple to a reference current ripple.

5. The system of claimed 4 wherein the active damper controller is configured to close the stabilization switch in response to the detected current ripple exceeding the reference current ripple.

6. The system as claimed in claim 5 wherein the stabilization switch is closed to decrease the current ripple through the stabilization resistor.

7. The system as claimed in claim 1 wherein the active damper controller is configured to close the stabilization switch that decreases at a steady state current ripple through the stabilization resistor.

8. The system as claimed in claim 7 wherein the input filter is an LC filter that includes an input capacitor coupled to an input inductor.

9. The system as claimed in claim 8 wherein in response to the active damper controller closing the stabilization switch, the stabilization resistor couples to the input inductor in parallel.

10. An active damping switching system, comprising:
    an active damper apparatus, including:
        a stabilization resistor;
        a stabilization switch coupled to the stabilization resistor;
        an active damper controller coupled to the stabilization switch;
        a current sensor coupled to the active damper controller;
    a direct current (DC) power source coupled to the active damper apparatus;
    a constant power load; and
    an input filter disposed between the constant power load and the active damper apparatus;

wherein the active damper controller comprises a bandpass filter configured to select a current ripple from a DC input wherein the active damper controller further comprises a gate drive coupled to a zero cross detector and configured to generate a stabilization pulse in response to the zero cross detector detecting the current ripple crossing zero.

11. An active damping switching apparatus, comprising:
a stabilization resistor;
a stabilization switch coupled to the stabilization resistor;
an active damper controller coupled to the stabilization switch, the active damper controller comprising:
a bandpass filter configured to select a current ripple from a DC input;
an absolute value function unit coupled to the bandpass filter;
a low pass filter coupled to the absolute value function unit to produce a detected current ripple;
a comparator configured to compare the detected current ripple to a reference current ripple;
a zero cross detector coupled to the comparator; and
a gate drive coupled to zero the cross detector and configured to close the stabilization switch in response to the zero cross detector detecting the current ripple crossing zero; and
a current sensor coupled to the active damper controller.

12. The apparatus as claimed in claim 11 wherein the active damper controller is configured to generate a stabilization pulse that closes the stabilization switch that decreases a steady state current ripple through the stabilization resistor.

13. The system as claimed in claim 11 wherein the active damper controller is configured to select a current ripple from a DC input as a detected current ripple.

14. The system as claimed in claim 13 wherein the active controller is configured to compare the detected current ripple to a reference current ripple.

15. The system of claimed 14, further comprising a stabilization switch and wherein the active controller is configured to close the stabilization switch in response to the detected current ripple exceeding the reference current ripple.

* * * * *